No. 697,160. Patented Apr. 8, 1902.
W. OSTENDORFF.
WATER COOLING TOWER.
(Application filed Oct. 7, 1901.)

(No Model.)

Witnesses
Edward C. Rowland
Kathleen Snell

Inventor
William Ostendorff.
By his Attorney
Andrew Wilson

UNITED STATES PATENT OFFICE.

WILLIAM OSTENDORFF, OF UNION HILL, NEW JERSEY.

WATER-COOLING TOWER.

SPECIFICATION forming part of Letters Patent No. 697,160, dated April 8, 1902.

Application filed October 7, 1901. Serial No. 77,788. (No model.)

*To all whom it may concern:*

Be it known that I, WILLIAM OSTENDORFF, a citizen of the United States, residing at Union Hill, New Jersey, have invented certain new and useful Improvements in Water-Cooling Towers, of which the following is a specification.

My invention relates to that class of water-cooling towers wherein the temperature of the water is reduced by causing it to fall through the air from a height in the form of drops or sprays; and my present improvements consist in certain details of the apparatus for spraying the water and also in improvements for preventing the falling spray from being driven out of its proper course by abnormal drafts of air.

I will now proceed to more fully describe my improvements, and in so doing I will refer to the accompanying drawings, wherein—

Figure 1:
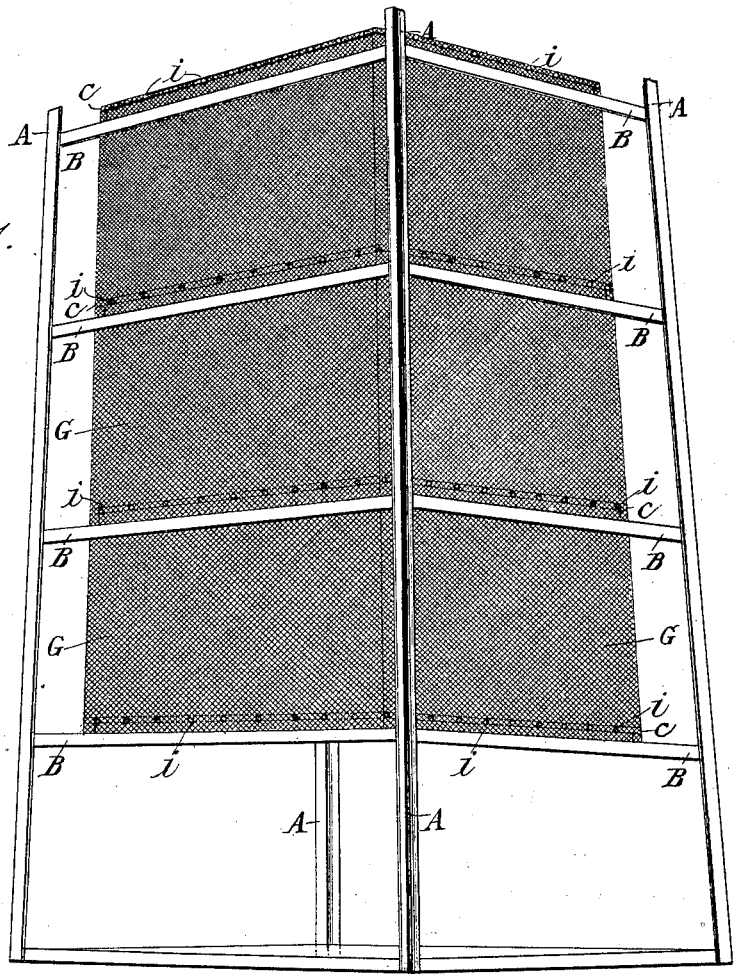
Figure 2:
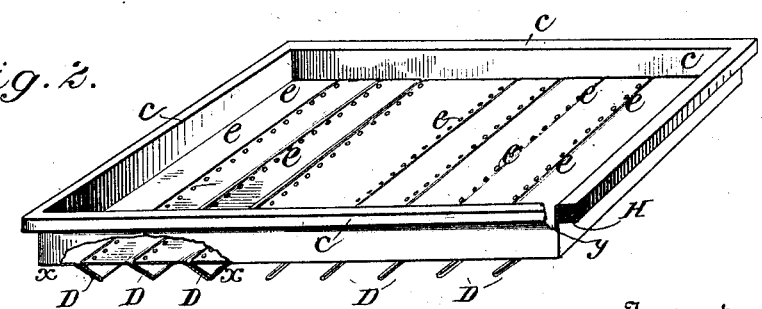

Figure 1 is a perspective view of a water-cooling tower embodying my improvements; and Fig. 2 is a perspective view of one of my improved spraying-pans, a portion of one side of the pan being broken away on the line *x x* to show the details of construction and a corner of the pan being broken away at *y* to show the wooden reinforcing thereof.

Similar letters of reference designate similar parts in both the figures.

The framework of my improved tower is constructed, primarily, of uprights A A A, supporting cross-pieces B B B, which serve to divide the tower into several sections or stages.
Upon these stages are placed perforated spraying-pans to catch the water in its descent from one stage to another and to break it up into drops or spray as it passes through the bottoms of the pans. In my Patent No. 661,192, of November 6, 1900, I have described and claimed a system of deflectors beneath the spraying-pans to secure the more effectual spraying of the water; and my present application describes certain improvements in the construction of the pan-bottom, provided with such deflectors. My spraying-pans are formed of sheet metal, the upper edges C C C being turned over in a flange, which may be reinforced within with a wooden strip to stiffen the edges of the pan. The bottom of the pan is likewise formed of sheet metal, which is bent or crimped into the flanges D D D, and the bottom of the pan above these inclined flanges is perforated, as at *e e e*. The water falling into the pan will pass through the perforations *e e e* and falling upon the deflecting-flanges D D D will be spread and deflected and fall from the edges of the flanges in drops or spray, as described in my previous application. By constructing the bottom of the pan with flanges integral therewith I am enabled to secure a stiffer bottom than one in which the flanges are riveted or otherwise secured to the bottom, and I also avoid weakening the bottom by punching rivet or bolt holes through it, which when galvanized material is used are apt to present raw surfaces to be corroded by the action of the water.

These towers for cooling water by atmospheric evaporation are preferably placed in positions where there is an abundant circulation of air, and the water falling from a considerable height in the form of fine drops or spray and under the influence of the deflectors is apt to be driven by the wind more or less out of the sides of the tower. The amount of water thus scattered and lost will depend upon the velocity of the wind, which if considerable will carry quite a large quantity of the spray with it. To prevent this loss of water and at the same time allow the free ventilation of air, I surround the portion of the tower between the pans with a wire or similar netting, as shown at G G G. This netting is preferably fastened to the edges of the pans, which can readily be accomplished by nailing, as with nails *i i*, into the wooden stiffening-strips H on the edges of the pans. This netting will allow air to pass freely through the tower, but it will catch and arrest the spray which may be carried against the netting and prevent it from being blown away from the tower. The spray when thrown against the netting will accumulate in larger drops and run down the netting until it reaches the pans or falls down into the tank beneath the tower, and this action of the water in running comparatively slowly down the netting, which is kept cool by its direct contact with the outer air, will still further reduce the temperature of the water in its downward passage.

By means of my improvements I obtain more durable and efficient spraying-pans than those used in previous constructions, and these pans are also adapted for the ready attachment of the surrounding netting, which netting serves to prevent the waste of water by lateral escape of the spray without changing the effectiveness of the tower in cooling the water.

Having thus described my invention, what I claim, and desire to secure by Letters Patent of the United States, is—

The combination, with the supporting-framework of a water-cooling apparatus, of a plurality of spraying-pans arranged one above the other, and supported by said framework, each pan having its bottom provided on the under side with doubled portions forming inclined deflecting-flanges integral therewith, and also provided with perforations through said bottoms above the upper sides of said deflecting-flanges, and with wooden strips reinforcing the upper edges of said pans, and guard-nettings in the spaces between said pans and attached thereto by fastenings driven into said wooden reinforcing-strips, substantially as described.

WILLIAM OSTENDORFF.

Witnesses:
 KATHLEEN SNELL,
 THOS. KILVERT.